United States Patent
Takahashi

(10) Patent No.: US 8,098,050 B2
(45) Date of Patent: Jan. 17, 2012

(54) CHARGE/DISCHARGE CONTROL DEVICE FOR SECONDARY BATTERY AND VEHICLE EQUIPPED WITH THE SAME

(75) Inventor: Hidenori Takahashi, Okazaki (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 443 days.

(21) Appl. No.: 12/513,999

(22) PCT Filed: Nov. 21, 2007

(86) PCT No.: PCT/JP2007/073006
§ 371 (c)(1),
(2), (4) Date: May 7, 2009

(87) PCT Pub. No.: WO2008/066092
PCT Pub. Date: Jun. 5, 2008

(65) Prior Publication Data
US 2010/0001692 A1    Jan. 7, 2010

(30) Foreign Application Priority Data
Nov. 28, 2006 (JP) ................. 2006-320360

(51) Int. Cl.
H02J 7/04 (2006.01)
H02J 7/16 (2006.01)
H02J 7/24 (2006.01)

(52) U.S. Cl. ........ 320/150; 320/152; 320/157; 320/162; 320/164

(58) Field of Classification Search .......... 320/150
See application file for complete search history.

(56) References Cited

U.S. PATENT DOCUMENTS

| 6,600,293 | B2 | 7/2003 | Kikuchi | |
| 6,727,676 | B2* | 4/2004 | Ochiai | 320/104 |
| 2008/0024089 | A1* | 1/2008 | Meng et al. | 320/128 |

FOREIGN PATENT DOCUMENTS

| JP | 09-056011 A | 2/1997 |
| JP | 2000-040532 A | 2/2000 |
| JP | 2002-325373 A | 11/2002 |
| JP | 2002-345165 A | 11/2002 |
| JP | 2003-047108 A | 2/2003 |
| JP | 2003-219510 A | 7/2003 |
| JP | 2005-020955 A | 1/2005 |
| JP | 2005-80330 A | 3/2005 |

* cited by examiner

*Primary Examiner* — Edward Tso
*Assistant Examiner* — Ahmed Omar
(74) *Attorney, Agent, or Firm* — Sughrue Mion, PLLC

(57) ABSTRACT

A charge/discharge control device for a secondary battery mounted on a vehicle includes a temperature sensor detecting a temperature of a battery and a control device setting a battery power charged to and discharged from the battery base on the temperature detected by the temperature sensor and the state of charge of the battery. The control device sets at least one of a first value, a second value and a third value to be increased as the battery temperature rises, the first value indicating the state of charge at the time of switching between charging and discharging of the battery, the second value indicating the state of charge at the time when the battery power charged to the battery reaches a limit value in the case where the state of charge falls below the first value, and the third value indicating the state of charge at the time when the battery power discharged from the battery reaches the limit value in the case where the state of charge exceeds the first value.

16 Claims, 12 Drawing Sheets

CHARGE/DISCHARGE CONTROL DEVICE FOR SECONDARY BATTERY AND VEHICLE EQUIPPED WITH THE SAME

TECHNICAL FIELD

The present invention relates to a charge/discharge control device for a secondary battery and a vehicle equipped with the same, and particularly to a technique for controlling charge/discharge power based on the temperature of the secondary battery.

BACKGROUND ART

The electric vehicle (including a hybrid vehicle and a fuel cell vehicle) obtaining all or a part of the vehicle driving force by an electric motor is equipped with a secondary battery, and the electric motor is driven by the electric power stored in this secondary battery. The function specific to such an electric vehicle includes regenerative braking. During braking of the vehicle, regenerative braking serves to cause the electric motor to operate as a power generator to thereby convert the kinetic energy of the vehicle into electric energy for braking. Furthermore, the obtained electric energy is stored in the secondary battery and reused at the time of acceleration and the like. Accordingly, in the vehicle that runs only by using the conventional internal combustion engine, the regenerative braking allows the reuse of the energy which has been dissipated into the atmosphere as heat energy, with the result that the energy efficiency can be significantly improved.

The secondary battery requires sufficient margin for effectively storing the electric power in the secondary battery which is generated at the time of regenerative braking. Furthermore, in the hybrid vehicle of a type in which the power generator can be driven by the heat engine mounted on the vehicle to generate electric power for charging the secondary battery, the electric power stored in the secondary battery, that is, the amount of the stored electric power can be freely controlled. Accordingly, in such a hybrid vehicle, it is desirable to control the amount of the electric power stored in the secondary battery to be approximately intermediate (50-60%) between a fully charged state (100%) and a non-charged state (0%) such that the regenerative power can be received and, if required, the electric power can be immediately supplied to the power generator.

The secondary battery mounted on the electric vehicle is used in various usage environments. When used in the cold climate area, the secondary battery may be used in the environment at a temperature of −10° C. or lower, and, in some cases, −20° C. or lower. Furthermore, as for the case where the secondary battery is used under high temperature conditions or where the secondary battery is used to cause an increase in temperature of the secondary battery, the secondary battery may be used in the environment at a temperature of 40° C. or above. When the secondary battery is used in the above-described severe environments, the control in accordance with the characteristics of the secondary battery is required. In particular, there is a problem that, at a low temperature, since the rate of the chemical reaction within the secondary battery decreases, a large current flowing therethrough causes a decrease in voltage, which prevents the required voltage from being achieved. In addition, there is also a problem that the secondary battery becomes deteriorated at a high temperature.

Japanese Patent Laying-Open No. 2003-219510 discloses a charge/discharge control device for a secondary battery which is capable of performing an appropriate charge/discharge control depending on the environment in which the battery is used and the battery state. The charge/discharge control device for a secondary battery disclosed in the above-mentioned document includes a temperature detecting unit detecting the temperature of the secondary battery, and a charge/discharge power limiting unit, in the case where the detected temperature is not more than a prescribed temperature, controlling the charge/discharge power not to exceed a predetermined charge/discharge power upper limit value which varies in accordance with the temperature.

In general, the higher the temperature of the battery is, the more the deterioration of the battery is accelerated. When the temperature of the secondary battery is not less than a prescribed temperature, the charge/discharge power limiting unit determines its upper limit value such that the upper limit value of the charge/discharge power is decreased as the temperature of the secondary battery rises. Consequently, a further increase in the battery temperature can be prevented, which allows the battery deterioration to be suppressed.

However, according to the technique disclosed in Japanese Patent Laying-Open No. 2003-219510, the electric power which can be obtained from the secondary battery varies in accordance with the temperature of the secondary battery. It is preferable that the electric power can be obtained from the secondary battery without limitation by temperature because the performance of the secondary battery can be more effectively achieved. Japanese Patent Laying-Open No. 2003-219510, however, does not disclose such a method.

DISCLOSURE OF THE INVENTION

An object of the present invention is to provide a charge/discharge control device for a secondary battery which is capable of more effectively achieving the performance of the secondary battery, and a vehicle equipped with the charge/discharge control device.

In summary, the present invention provides a charge/discharge control device for a secondary battery including a temperature detecting unit detecting a battery temperature of the secondary battery; a state-of-charge detecting unit detecting a state of charge of the secondary battery to output a state value indicating the state of charge; and a setting unit. In the case where the state value falls below a first value corresponding to a threshold value for determining whether charging or discharging of the secondary battery is prioritized, the setting unit sets a charge power of the secondary battery such that the charge power increases as the state value decreases and a value of the charge power attains a first limit value when the state value reaches a second value. In the case where the state value exceeds the first value, the setting unit sets a discharge power of the secondary battery such that the discharge power increases as the state value increases and a value of the discharge power attains a second limit value when the state value reaches a third value. The setting unit selects at least one of the first value, the second value and the third value as an object to be varied which varies in accordance with the battery temperature detected by the temperature detecting unit, and increases a value of the object to be varied as the battery temperature rises.

Preferably, the setting unit selects the object to be varied from the first to third values based on a distribution of the state value.

Preferably, the setting unit selects the second value as the object to be varied when a frequency in which the state value is smaller than the first value is higher than a frequency in which the state value is larger than the first value, and selects the third value as the object to be varied when a frequency in which the state value is larger than the first value is higher than a frequency in which the state value is smaller than the first value.

Preferably, the setting unit selects the first value as the object to be varied when switching between charging and discharging of the secondary battery is repeated a predetermined number of times or more within a predetermined period of time.

Preferably, the secondary battery includes a lithium-ion battery.

According to another aspect of the present invention, a vehicle includes a secondary battery and a charge/discharge control device for a secondary battery. The charge/discharge control device includes a temperature detecting unit detecting a battery temperature of the secondary battery; a state-of-charge detecting unit detecting a state of charge of the secondary battery to output a state value indicating the state of charge; and a setting unit. In the case where the state value falls below a first value corresponding to a threshold value for determining whether charging or discharging of the secondary battery is prioritized, the setting unit sets a charge power of the secondary battery such that the charge power increases as the state value decreases and a value of the charge power attains a first limit value when the state value reaches a second value. In the case where the state value exceeds the first value, the setting unit sets a discharge power of the secondary battery such that the discharge power increases as the state value increases and a value of the discharge power attains a second limit value when the state value reaches a third value. The setting unit selects at least one of the first value, the second value and the third value as an object to be varied which varies in accordance with the battery temperature detected by the temperature detecting unit, and increases a value of the object to be varied as the battery temperature rises.

Preferably, the setting unit selects the object to be varied from the first to third values based on a distribution of the state value.

Preferably, the setting unit selects the second value as the object to be varied when a frequency in which the state value is smaller than the first value is higher than a frequency in which the state value is larger than the first value, and selects the third value as the object to be varied when a frequency in which the state value is larger than the first value is higher than a frequency in which the state value is smaller than the first value.

Preferably, the setting unit selects the first value as the object to be varied when switching between charging and discharging of the secondary battery is repeated a predetermined number of times or more within a predetermined period of time.

Preferably, the secondary battery includes a lithium-ion battery.

According to still another aspect of the present invention, a charge/discharge control device for a secondary battery includes a temperature detecting unit detecting a battery temperature of the secondary battery, a state-of-charge detecting unit detecting a state of charge of the secondary battery, and a setting unit setting a battery power charged to and discharged from the secondary battery based on the battery temperature detected by the temperature detecting unit and the state of charge detected by the state-of-charge detecting unit. The setting unit sets at least one of a first value, a second value and a third value to be increased as the battery temperature rises, the first value indicating the state of charge at the time of switching between charging and discharging of the secondary battery, the second value indicating the state of charge at the time when the battery power charged to the secondary battery reaches a limit value in a case where the state of charge falls below the first value, and the third value indicating the state of charge at the time when the battery power discharged from the secondary battery reaches the limit value in a case where the state of charge exceeds the first value. The setting unit sets the battery power based on the first to third values and the state of charge detected by the state-of-charge detecting unit.

Preferably, the setting unit selects a value of an object to be set from the first to third values, based on a distribution of a value of the state of charge detected by the state-of-charge detecting unit.

More preferably, the setting unit selects the second value as the value of the object to be set when a frequency in which the state of charge is smaller than the first value is higher than a frequency in which the state of charge is larger than the first value, and selects the third value as the value of the object to be set when a frequency in which the state of charge is larger than the first value is higher than a frequency in which the state of charge is smaller than the first value.

More preferably, the setting unit selects the first value as the value of the object to be set when switching between charging and discharging of the secondary battery is repeated a predetermined number of times or more within a predetermined period of time.

Preferably, the secondary battery includes a lithium-ion battery.

According to still another aspect of the present invention, a vehicle includes a secondary battery and a charge/discharge control device for a secondary battery. The charge/discharge control device includes a temperature detecting unit detecting a battery temperature of the secondary battery, a state-of-charge detecting unit detecting a state of charge of the secondary battery, and a setting unit setting a battery power charged to and discharged from the secondary battery based on the battery temperature detected by the temperature detecting unit and the state of charge detected by the state-of-charge detecting unit. The setting unit sets at least one of a first value, a second value and a third value to be increased as the battery temperature rises, the first value indicating the state of charge at the time of switching between charging and discharging of the secondary battery, the second value indicating the state of charge at the time when the battery power charged to the secondary battery reaches a limit value in a case where the state of charge falls below the first value, and the third value indicating the state of charge at the time when the battery power discharged from the secondary battery reaches the limit value in a case where the state of charge exceeds the first value. The setting unit sets the battery power based on the first to third values and the state of charge detected by the state-of-charge detecting unit.

Preferably, the setting unit selects a value of an object to be set from the first to third values, based on a distribution of a value of the state of charge detected by the state-of-charge detecting unit.

More preferably, the setting unit selects the second value as the value of the object to be set when a frequency in which the state of charge is smaller than the first value is higher than a frequency in which the state of charge is larger than the first value, and selects the third value as the value of the object to be set when a frequency in which the state of charge is larger than the first value is higher than a frequency in which the state of charge is smaller than the first value.

More preferably, the setting unit selects the first value as the value of the object to be set when switching between charging and discharging of the secondary battery is repeated a predetermined number of times or more within a predetermined period of time.

Preferably, the secondary battery includes a lithium-ion battery.

Therefore, according to the present invention, the performance of the secondary battery can be more effectively achieved.

BEST MODES FOR CARRYING OUT THE INVENTION

Figure 1:
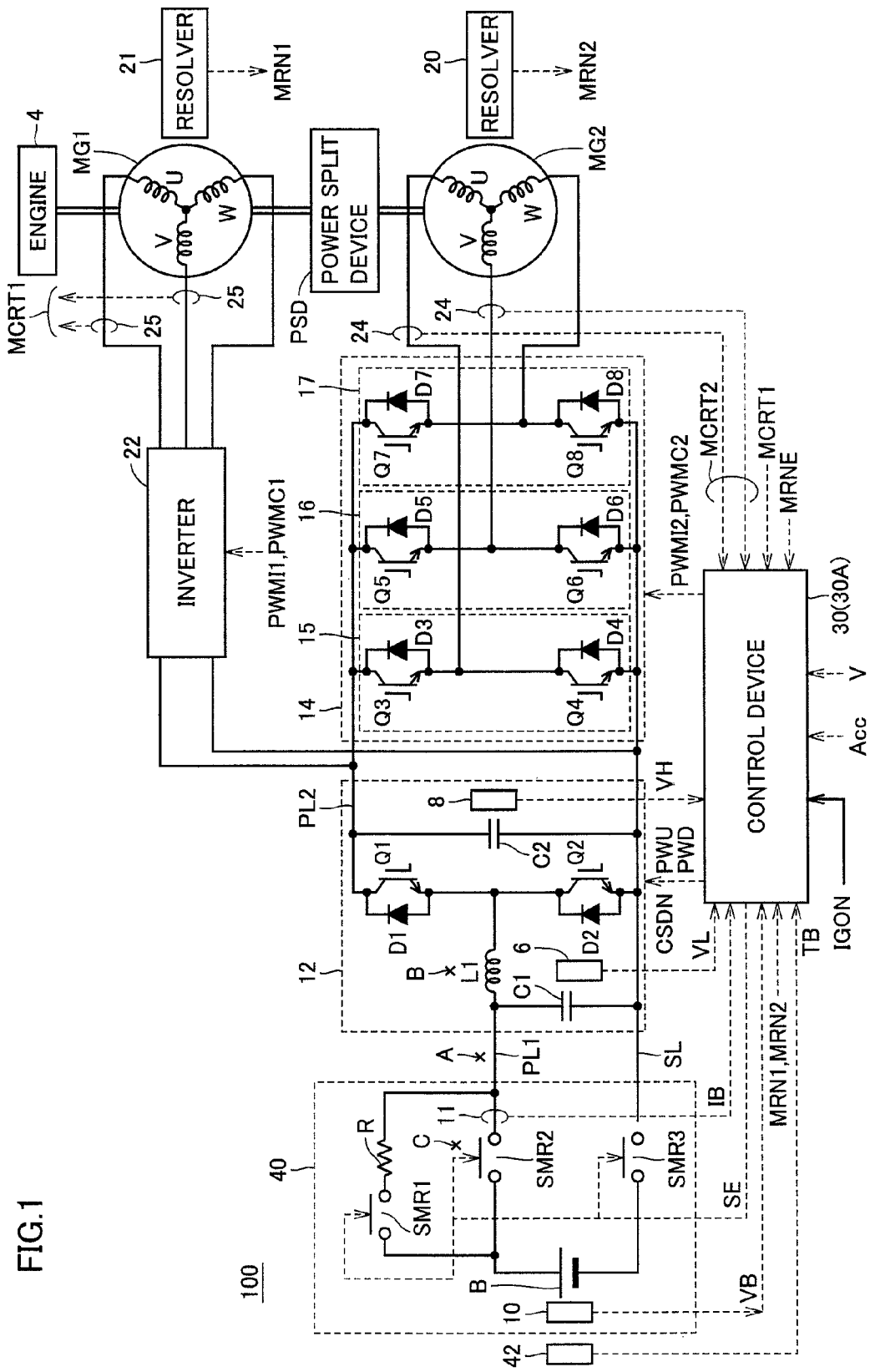
FIG. 1 is a schematic block diagram of a vehicle equipped with a charge/discharge control device for a secondary battery according to a first embodiment.

The embodiments of the present invention will be hereinafter described in detail with reference to the accompanying drawings, in which the same or corresponding components are designated by the same reference characters, and description thereof will not be repeated.

First Embodiment

FIG. 1 is a schematic block diagram of a vehicle equipped with a charge/discharge control device for a secondary battery according to a first embodiment.

Referring to FIG. 1, a vehicle 100 includes an engine 4 as an internal combustion engine, a battery unit 40, motor generators MG1 and MG2, inverters 22 and 14 provided corresponding to motor generators MG1 and MG2, respectively, a power split device PSD, a boost converter 12, resolvers 20 and 21, current sensors 24 and 25, a control device 30, and a wheel which is not shown.

Battery unit 40 and boost converter 12 are electrically connected via a power supply line PL1 and a ground line SL.

Battery unit 40 includes a battery B; a system main relay SMR3 connected between the negative electrode of battery B and ground line SL; a system main relay SMR2 connected between the positive electrode of battery B and power supply line PL1; and a system main relay SMR1 and a limiting resistor R connected in series between the positive electrode of battery B and power supply line PL1. The conducting/non-conducting state in each of system main relays SMR1-SMR3 is controlled in accordance with a control signal SE received from control device 30.

Battery unit 40 further includes a voltage sensor 10 measuring a voltage VB across the terminals of battery B.

A nickel-hydrogen or lithium-ion secondary battery can be used as battery B. It is preferable to use a lithium-ion battery as battery B as described below.

A temperature sensor 42 for detecting a temperature TB of battery B is provided in the vicinity of battery unit 40. Temperature sensor 42 may be disposed in the proximity of battery B or may be located, for example, where the temperature of battery B can be estimated. Specifically, temperature sensor 42 can be disposed, for example, in the proximity of power supply line PL1 (a point A), in the proximity of reactor L1 (a point B), in the proximity of system main relay SMR2 (a point C), or the like.

Boost converter 12 boosts the voltage between ground line SL and power supply line PL1 to supply the voltage to inverters 14 and 22 via ground line SL and power supply line PL2. Inverter 14 converts the direct-current (DC) voltage applied from boost converter 12 into a three-phase alternating-current (AC) and outputs the same to motor generator MG2. Inverter 22 converts the DC voltage applied from boost converter 12 into a three-phase AC and outputs the same to motor generator MG1.

Boost converter 12 includes a smoothing capacitor C1 having one end connected to power supply line PL1 and the other end connected to ground line SL; a reactor L1 having one end connected to power supply line PL1; IGBT elements Q1 and Q2 connected in series between power supply line PL2 and ground line SL; diodes D1 and D2 connected in parallel to IGBT elements Q1 and Q2, respectively; a smoothing capacitor C2; a voltage sensor 6 detecting a voltage VL between power supply line PL1 and ground line SL; a voltage sensor 8 detecting a voltage VH between power supply line PL2 and ground line SL.

Smoothing capacitor C1 smoothes the DC voltage that is output from battery B but has not been boosted. Smoothing capacitor C2 smoothes the DC voltage that has been boosted by boost converter 12.

Reactor L1 has the other end connected to the emitter of IGBT element Q1 and the collector of IGBT element Q2. Diode D1 has a cathode connected to the collector of IGBT element Q1 and has an anode connected to the emitter of IGBT element Q1. Diode D2 has a cathode connected to the collector of IGBT element Q2 and has an anode connected to the emitter of IGBT element Q2.

Inverter 14 converts the DC voltage output from boost converter 12 into a three-phase AC and outputs it to motor generator MG2 driving the wheels. Furthermore, in accordance with the regenerative braking, inverter 14 returns the electric power generated in motor generator MG2 to boost converter 12. In this case, boost converter 12 is controlled by control device 30 so as to operate as a step-down circuit.

Inverter 14 includes a U-phase arm 15, a V-phase arm 16 and a W-phase arm 17. U-, V- and W-phase arms 15, 16 and 17 are connected in parallel between power supply line PL2 and ground line SL.

U-phase arm 15 includes IGBT elements Q3 and Q4 connected in series between power supply line PL2 and ground line SL, and diodes D3 and D4 connected in parallel to IGBT elements Q3 and Q4, respectively. Diode D3 has a cathode connected to the collector of IGBT element Q3 and has an anode connected to the emitter of IGBT element Q3. Diode D4 has a cathode connected to the collector of IGBT element Q4 and has an anode connected to the emitter of IGBT element Q4.

V-phase arm 16 includes IGBT elements Q5 and Q6 connected in series between power supply line PL2 and ground line SL, and diodes D5 and D6 connected in parallel to IGBT elements Q5 and Q6, respectively. Diode D5 has a cathode connected to the collector of IGBT element Q5 and has an anode connected to the emitter of IGBT element Q5. Diode D6 has a cathode connected to the collector of IGBT element Q6 and has an anode connected to the emitter of IGBT element Q6.

W-phase arm 17 includes IGBT elements Q7 and Q8 connected in series between power supply line PL2 and ground line SL, and diodes D7 and D8 connected in parallel to IGBT elements Q7 and Q8, respectively. Diode D7 has a cathode connected to the collector of IGBT element Q7 and has an anode connected to the emitter of IGBT element Q7. Diode D8 has a cathode connected to the collector of IGBT element Q8 and has an anode connected to the emitter of IGBT element Q8.

Motor generator MG2 is a three-phase permanent magnet synchronous motor, in which each of three coils of the U-, V- and W-phases has one end connected in common to a neutral point. The U-phase coil has the other end connected to a connection node of IGBT elements Q3 and Q4. The V-phase coil has the other end connected to a connection node of IGBT elements Q5 and Q6. The W-phase coil has the other end connected to a connection node of IGBT elements Q7 and Q8. Motor generator MG2 has a rotation shaft coupled to the wheels by a reduction gear or a differential gear which is not shown.

Power split device PSD is coupled to the engine and motor generators MG1, MG2 to distribute the power among them. For example, as power split device PSD, a planetary gear train having three rotation shafts of a sun gear, a planetary carrier and a ring gear can be used. These three rotation shafts are connected to the rotation shafts of the engine, motor generators MG1 and MG2, respectively. For example, motor generator MG1 has a hollow rotor through which a crank shaft of the engine is passed, to thereby allow the engine, motor generators MG1 and MG2 to be mechanically connected to power split device PSD.

Current sensor 24 detects the current flowing through motor generator MG2 as a motor current value MCRT2 and outputs motor current value MCRT2 to control device 30.

Inverter 22 is connected to boost converter 12 in parallel with inverter 14. Inverter 22 converts the DC voltage output from boost converter 12 to a three-phase AC and outputs it to motor generator MG1. Inverter 22 receives the boosted voltage from boost converter 12 to drive motor generator MG1, for example, to start the engine.

Furthermore, inverter 22 returns the electric power to boost converter 12 which is generated in motor generator MG1 by the rotation torque transmitted from the crankshaft of engine 4. In this case, boost converter 12 is controlled by control device 30 so as to operate as a step-down circuit.

Although not shown, the configuration within inverter 22 is the same as that of inverter 14, and detailed description thereof will not be repeated.

Motor generator MG1 is a three-phase permanent magnet synchronous motor, in which each of three coils of the U-, V- and W-phases has one end connected in common to a neutral point. Each of the phase coils has the other end connected to inverter 22.

Current sensor 25 detects the current flowing through motor generator MG1 as a motor current value MCRT1 and outputs motor current value MCRT1 to control device 30.

Control device 30 receives an engine rotation number NE, each value of voltages VB, VL, VH, a current IB, and temperature IB, motor current values MCRT1, MCRT2, and a start-up signal IGON. Control device 30 receives an accelerator pedal position Acc detected by an accelerator pedal position sensor which is not shown and a vehicle speed V detected by a vehicle speed sensor which is not shown.

Control device 30 receives the output of each of resolvers 20 and 21 to calculate motor rotation numbers MRN2 and MRN1, respectively. Motor rotation number MRN1 and motor current value MCRT1 are related to motor generator MG1, and motor rotation number MRN2 and motor current value MCRT2 are related to motor generator MG2.

Furthermore, voltage VB corresponds to a voltage of battery B and is measured by voltage sensor 10. Voltage VL corresponds to a voltage that is to be applied to smoothing capacitor C1 but has not been boosted by boost converter 12, and is measured by voltage sensor 6. Voltage VH corresponds to a voltage that is to be applied to smoothing capacitor C2 and has been boosted by boost converter 12, and is measured by voltage sensor 8.

Control device 30 outputs to boost converter 12 a control signal PWU instructing to boost the voltage, a control signal PWD to lower the voltage, and a signal CSDN to inhibit an operation.

Furthermore, control device 30 outputs to inverter 14 a drive instruction PWMI2 for converting voltage VH (DC voltage) as an output of boost converter 12 into an AC voltage for driving motor generator MG2, and a regeneration instruction PWMC2 for converting the AC voltage generated by motor generator MG2 into a DC voltage and returning the voltage to the boost converter 12 side. IGBT elements Q3-Q8 operate in response to these instructions.

Similarly, control device 30 outputs to inverter 22 a drive instruction PWMI1 for converting voltage VH (DC voltage) into an AC voltage for driving motor generator MG1, and a regeneration instruction PWMC1 for converting the AC voltage generated by motor generator MG1 into a DC voltage and returning the voltage to the boost converter 12 side.

Figure 2:
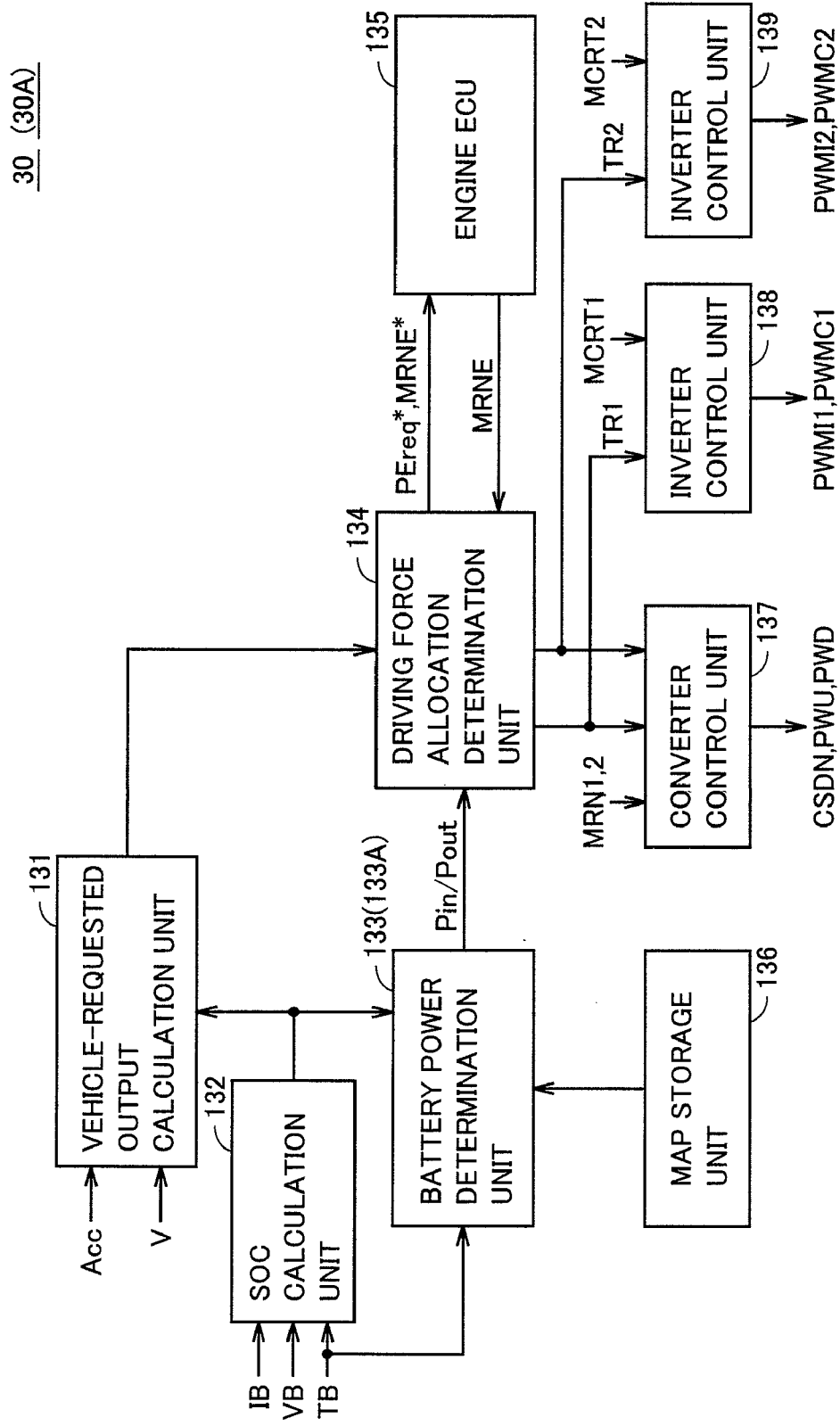
FIG. 2 is a functional block diagram of a control device 30 shown in FIG. 1.

FIG. 2 is a functional block diagram of control device 30 shown in FIG. 1. It is to be noted that control device 30 shown in FIG. 2 may be implemented by hardware or by software.

Referring to FIGS. 2 and 1, control device 30 includes a vehicle-requested output calculation unit 131, an SOC (State of Charge) calculation unit 132, a battery power determination unit 133, a driving force allocation determination unit 134, an engine ECU (Electronic Control Unit) 135, a map storage unit 136, a converter control unit 137, and inverter control units 138, 139.

Vehicle-requested output calculation unit 131 calculates the output required for the entire vehicle 100 shown in FIG. 1 (that is, the power requested by the vehicle) based on accelerator pedal position Acc, vehicle speed V, the state value (an SOC value) which shows the SOC of battery B output from SOC calculation unit 132.

SOC calculation unit 132 calculates the SOC value of battery B based on current IB, voltage VB and temperature TB. For example, the SOC value is defined as 100% when battery B is in a fully charged state, and is defined as 0% when battery B is in a non-charged state. When the state of charge of battery B changes between the non-charged state and the fully charged state, the SOC value is defined so as to vary between 0% and 100% depending on its state of charge.

Based on temperature TB and the SOC of battery B (the calculation result of SOC calculation unit 132), battery power determination unit 133 determines an electric power value Pin at the time when battery B is charged and an electric power value Pout at the time when battery B is discharged. The details of the process in battery power determination unit 133 will be described later.

Map storage unit 136 stores the map in which the SOC and electric power value Pin/Pout are associated with each other. Battery power determination unit 133 sets electric power value Pin/Pout based on temperature TB and the map stored in map storage unit 136.

Driving force allocation determination unit 134 receives the vehicle-requested output from vehicle-requested output calculation unit 131. Driving force allocation determination unit 134 receives electric power value Pin or Pout from battery power determination unit 133. Driving force allocation determination unit 134 receives engine rotation number MRNE from engine ECU 135. Driving force allocation determination unit 134 determines the torque allocation among engine 4, motor generators MG1 and MG2 for the vehicle-requested output.

As a specific example, driving force allocation determination unit 134 uses the vehicle-requested output as an output requested by engine 4 (an engine-requested output PEreq*) to select the point at which the highest efficiency of engine 4 is achieved (in other words, engine torque and rotation number) from the operation points at which this engine-requested output PEreq* can be output (the points defined by the torque and the rotation number). Driving force allocation determination unit 134 outputs the determined engine rotation number (a target rotation number MRNE*) to engine ECU 135. This causes engine ECU 135 to control the output of engine 4 (rotation number×torque) so as to match target rotation number MRNE* to the actual engine rotation number MRNE.

Furthermore, driving force allocation determination unit 134 determines the output of motor generator (MG1, MG2) based on engine-requested output PEreq* and electric power value Pin/Pout. Driving force allocation determination unit 134 then determines a torque command value TR2 of motor generator MG2 based on the output of motor generator (MG1, MG2). Driving force allocation determination unit 134 outputs torque command value TR2 to converter control unit 137 and inverter control unit 139.

In the case where a part of the power which is output from engine 4 is used as electric power for power generation by motor generator MG1, the electric power generated by motor generator MG1 is used for driving motor generator MG2. In this case, driving force allocation determination unit 134 further sets a torque command value TR1 to specify the torque required for motor generator MG1. Driving force allocation determination unit 134 outputs torque command value TR1 to converter control unit 137 and inverter control unit 138.

Converter control unit 137 receives torque command values TR1, TR2 and motor rotation numbers MRN1, MRN2 to output control signals PWU, PWD and signal CSDN.

Inverter control unit 138 receives torque command value TR1 and motor current value MCRT1 to output drive instruction PWMI1 and regeneration instruction PWMC1.

Inverter control unit 139 receives torque command value TR2 and motor current value MCRT2 to output drive instruction PVMI2 and regeneration instruction PWMC2.

<Control of SOC of Battery>

Figure 3:
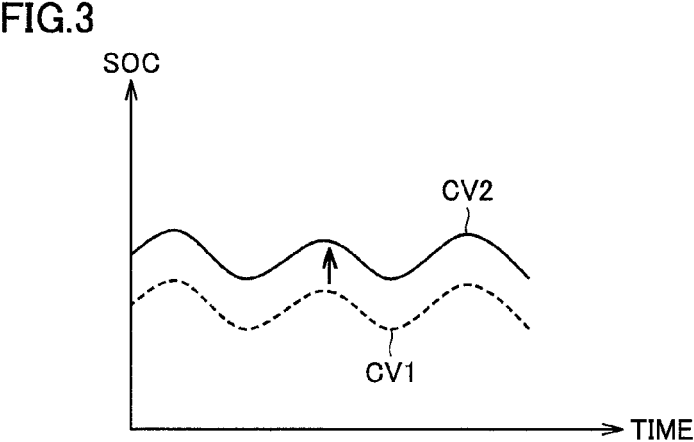
FIG. 3 is a diagram illustrating the control of an SOC by the charge/discharge control device according to the present embodiment.

FIG. 3 is a diagram illustrating the control of the SOC by the charge/discharge control device according to the present embodiment.

Figure 4:
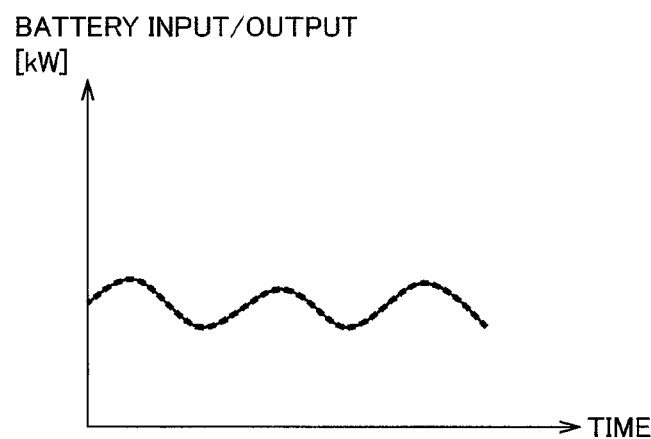
FIG. 4 is a diagram illustrating the control of the battery power by the charge/discharge control device according to the present embodiment.

FIG. 4 is a diagram illustrating the control of the battery power by the charge/discharge control device according to the present embodiment.

Referring to FIGS. 3 and 4, a curve CV1 shows a variation in the SOC value at a prescribed temperature (for example, +25° C.), and a curve CV2 shows a variation in the SOC value at a high temperature. In other words, in the present embodiment, the intermediate point of the variation in the SOC value is raised as the battery temperature rises. However, the battery power input to and output from the battery ("battery input/output" in FIG. 4) remain the same irrespective of the battery temperature.

Figure 5:
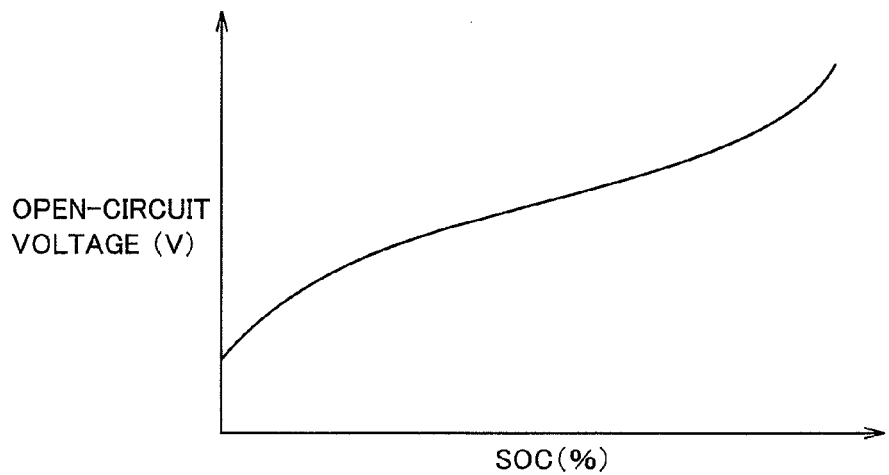
FIG. 5 is a general diagram showing the relationship between an SOC value and an open-circuit voltage of a battery.

FIG. 5 is a general diagram showing the relationship between the SOC value and the open-circuit voltage of the battery.

Referring to FIG. 5, it is apparent that the open-circuit voltage of the battery is increased as the SOC value increases.

Figure 6:
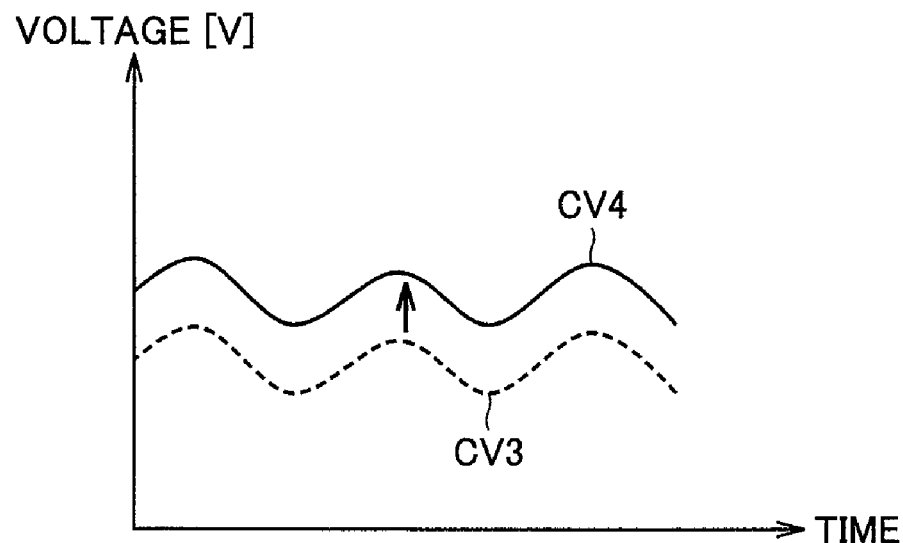
FIG. 6 is a diagram showing the variation in the voltage of the battery at the time when the SOC and an input/output electric power of the battery vary as shown in FIGS. 3 and 4.

FIG. 6 is a diagram showing the variation in the battery voltage at the time when the SOC and the input/output electric power of the battery vary as shown in FIGS. 3 and 4.

Referring to FIG. 6, a curve CV3 shows the variation in the battery voltage at a prescribed temperature (for example, +25° C.), and a curve CV4 shows the variation in the battery voltage at a high temperature. As shown in FIG. 5, the higher the SOC value is, the more the open-circuit voltage of the battery is increased. In other words, at the time of high temperature, the intermediate point of the variation in the SOC value is raised, and accordingly, the battery voltage is increased.

Figure 7:
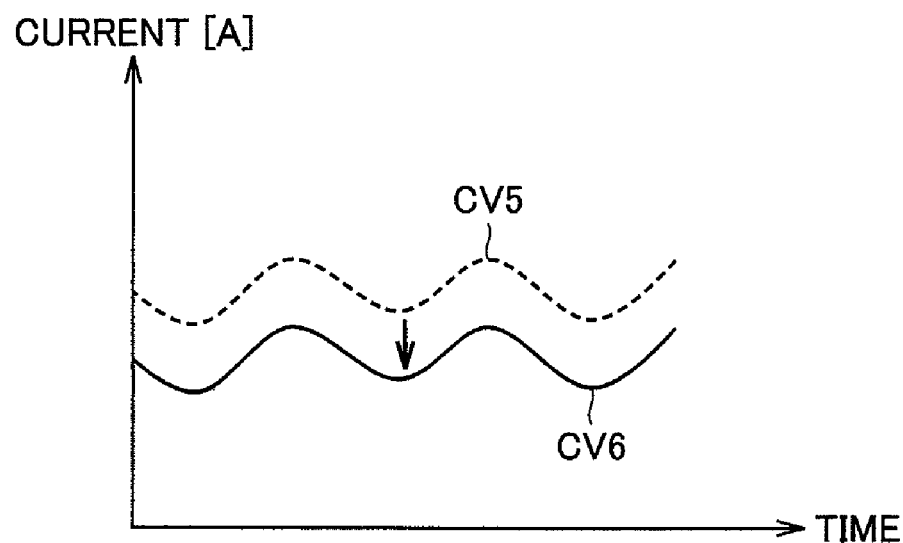
FIG. 7 is a diagram showing the variation in the battery current at the time when the battery voltage varies as shown in FIG. 6.

FIG. 7 is a diagram showing the variation in the battery current at the time when the battery voltage varies as shown in FIG. 6.

Referring to FIGS. 7 and 6, a curve CV5 shows the variation in the battery current at a prescribed temperature (for example, +25° C.), and a curve CV6 shows the variation in the battery current at the time of high temperature. As shown in FIG. 4, in the present embodiment, the electric power input to and output from the battery remains the same irrespective of the battery temperature. Accordingly, since the voltage value is increased as the battery temperature rises, the current value is decreased.

The battery generates heat as the battery is charged or discharged, which causes a rise in the battery temperature. Assuming that the value of the internal resistance of the battery is R and the battery current is I, the heat amount of the battery can be considered to be approximately proportional to $R \times I^2$. In the present embodiment, the current value of the battery is lowered when the battery temperature is high. This allows the heat generation of the battery to be suppressed, and accordingly, a further increase in the battery temperature can be suppressed.

Conventionally, in the case where the temperature of the battery exceeds the prescribed temperature, the charge/discharge power is limited. However, in the vehicle shown in FIG. 1, this limitation may cause the operating point of the engine to be displaced from the operating point at which the highest efficiency is achieved. In this case, the fuel efficiency may be decreased.

As a method for preventing the above-described problems, for example, a method of cooling the battery can be conceived. In this case, however, the cooling structure may be increased in size in order to efficiently cool the battery. In general, an increase in size of the cooling structure causes an increase in cost. In addition, it becomes necessary to ensure the cooling path of the battery to be provided and also to equip the vehicle with a cooling device having an ability to allow the battery to be cooled (a cooling fan, a cooling pump or the like).

On the other hand, in the present embodiment, since the electric power input to and output from the battery still remains the same even when the battery temperature changes, the operating point of the engine can be maintained at the operating point at which the highest efficiency is achieved. Therefore, according to the present embodiment, a decrease in fuel efficiency can be prevented.

Furthermore, according to the present embodiment, since the heat generation of the battery is suppressed when the battery temperature is high, an excessive increase in the battery temperature can be prevented. Consequently, even in the case where the cooling structure for cooling the battery is required, an increase in size of the cooling structure can be prevented.

Accordingly, the present embodiment allows the battery performance to be more effectively achieved and also allows the vehicle performance to be more effectively achieved.

It is to be noted that, in the present embodiment, it is preferable that the battery is a lithium-ion battery because the lithium-ion battery causes an endothermic reaction during the charging, which allows the temperature rise during the charging to be suppressed.

<Setting of Input/Output Electric Power>

Battery power determination unit 133 shown in FIG. 2 changes the map stored in map storage unit 136 in accordance with temperature TB as appropriate and determines electric power value Pin/Pout based on the changed map. The change of the map by battery power determination unit 133 will be hereinafter described.

Figure 8:
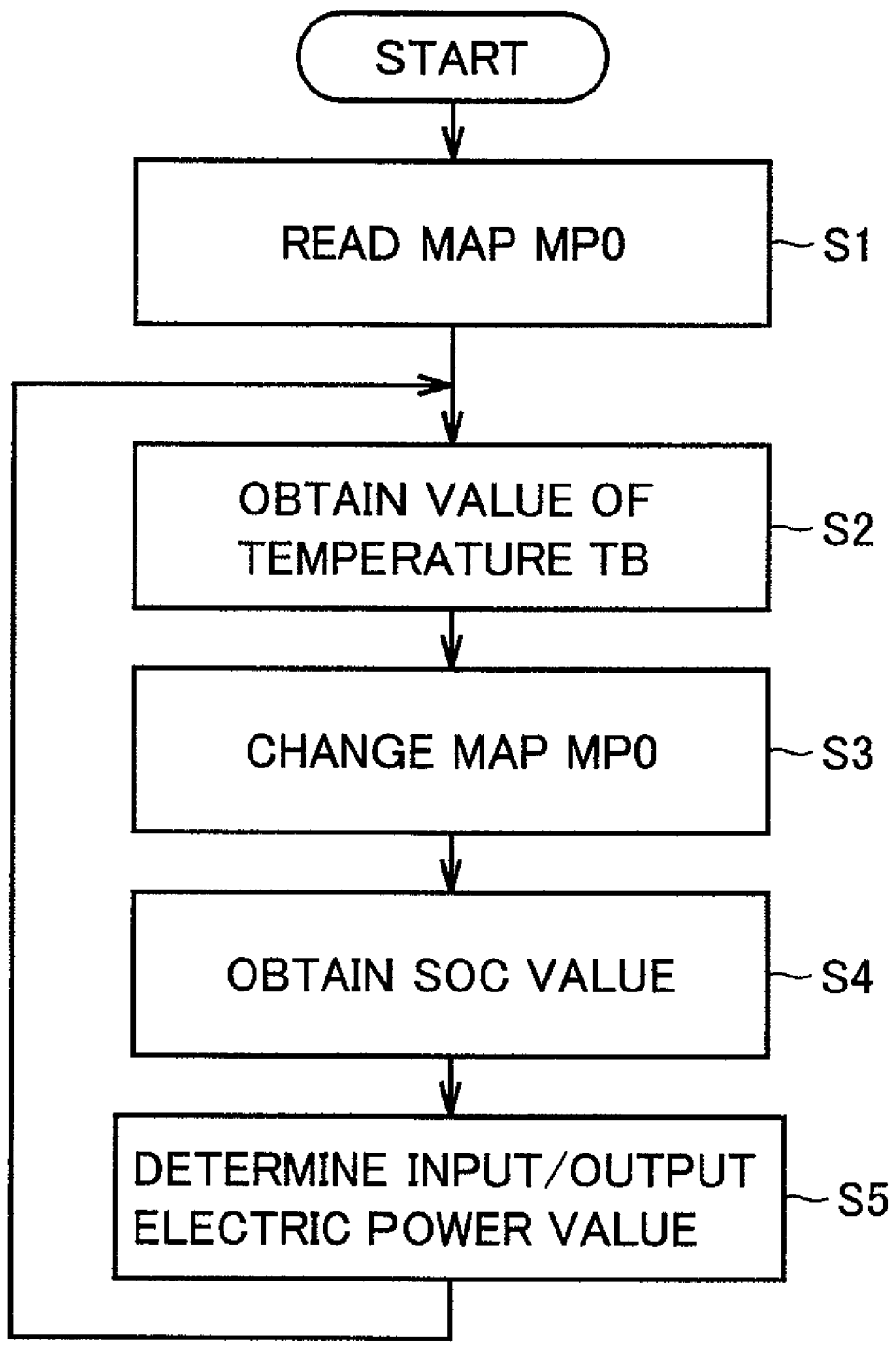
FIG. 8 is a flowchart illustrating a determination process of an electric power value Pin/Pout by a battery power determination unit 133 in FIG. 2.

FIG. 8 is a flowchart illustrating the determination process of electric power value Pin/Pout by battery power determination unit 133 in FIG. 2. It is to be noted that the process shown in this flowchart is called from the main routine and executed, for example, every time the predetermined condition is satisfied (for example, at the time when the vehicle is started).

Figure 9:
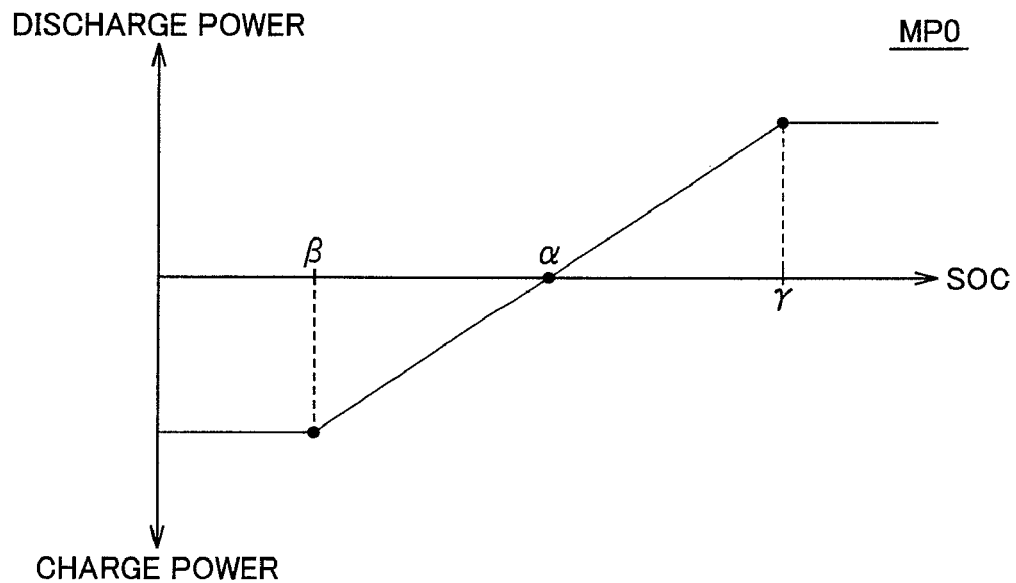
FIG. 9 is a diagram showing a map MP0 stored in a map storage unit 136.

Referring to FIGS. 8 and 2, in step S1, battery power determination unit 133 reads a map MP0 shown in FIG. 9 from map storage unit 136.

FIG. 9 is a diagram showing map MP0 stored in map storage unit 136.

Referring to FIG. 9, map MP0 serves to define the charge power and discharge power of the battery in accordance with the SOC value. Three SOC values including α, β and γ are defined in map MP0. SOC value α represents the SOC at the time of switching between charging and discharging of the battery. In other words, the battery is preferentially discharged in the state where the SOC value of the battery is larger than SOC value α. The battery is preferentially charged in the state where the SOC value of the battery is smaller than SOC value α.

SOC value β represents the SOC at the time when the charge power of the battery reaches a limit value (a first limit value which is an upper limit value of the charge power) in the case where the SOC falls below SOC value α. The more the SOC value is decreased, the more the charge power is increased. When the SOC value is not more than SOC value β, the charge power is maintained at the first limit value. SOC value γ represents the SOC at the time when the discharge power of the battery reaches the limit value (a second limit value which is an upper limit value of the discharge power) in the case where the SOC exceeds SOC value α. The more the SOC value is increased, the more the discharge power is increased. However, in the case where the SOC value is not less than SOC value γ, the discharge power is maintained at the second limit value.

By limiting the charge power in this way, the overcharge of the battery can be prevented. By similarly limiting the discharge power, the overdischarge of the battery can be prevented.

Again referring to FIGS. 8 and 2, in step S2, battery power determination unit 133 obtains a value of temperature TB. In step S3, battery power determination unit 133 changes map MP0 based on temperature TB. In step S4, battery power determination unit 133 obtains the SOC value from SOC calculation unit 132. In step S5, battery power determination unit 133 determines an input/output electric power value (electric power value Pin/Pout) of the battery based on the SOC value and the changed map MP0. When the process in step S5 is completed, the entire process returns to step S2.

Figure 10:
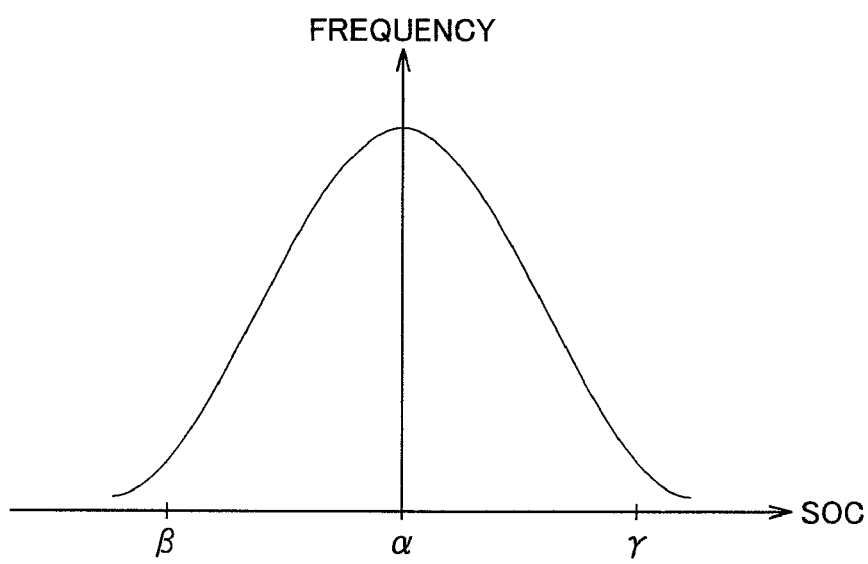
FIG. 10 is a diagram showing a distribution of the SOC value at the time of charging/discharging by battery power determination unit 133 in FIG. 2 in accordance with map MP0 in FIG. 9.

FIG. 10 is a diagram showing a distribution of the SOC value at the time when the battery is charged/discharged by battery power determination unit 133 in FIG. 2 in accordance with map MP0 in FIG. 9. It is to be noted that the distribution curve shown in FIG. 10 represents a distribution of the SOC value output from SOC calculation unit 132 when battery power determination unit 133 does not change map MP0.

Referring to FIG. 10, the state where the SOC value attains a value in the vicinity of SOC value a occurs with the highest frequency. As the SOC value varies from SOC value a to SOC value β, the frequency of the SOC values decreases accordingly. The same applies to the case where the SOC value varies from SOC value α to SOC value γ.

Figure 11:
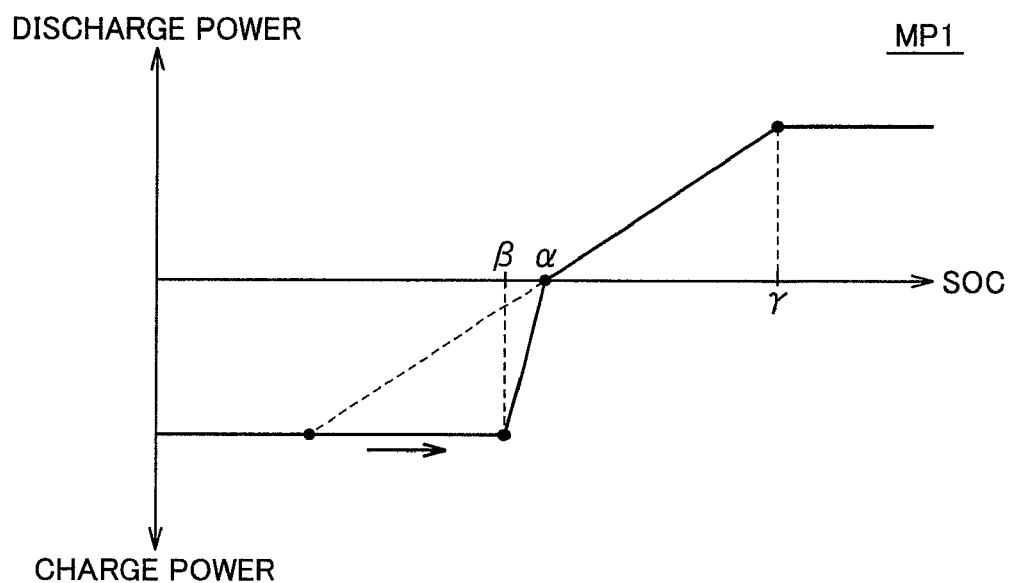
FIG. 11 is a diagram showing a modification of map MP0 shown in FIG. 9.

FIG. 11 is a diagram showing a modification of map MP0 shown in FIG. 9.

Referring to FIGS. 11 and 9, a map MP1 is different from map MP0 in that SOC value β is shifted to the high SOC value side.

Figure 12:
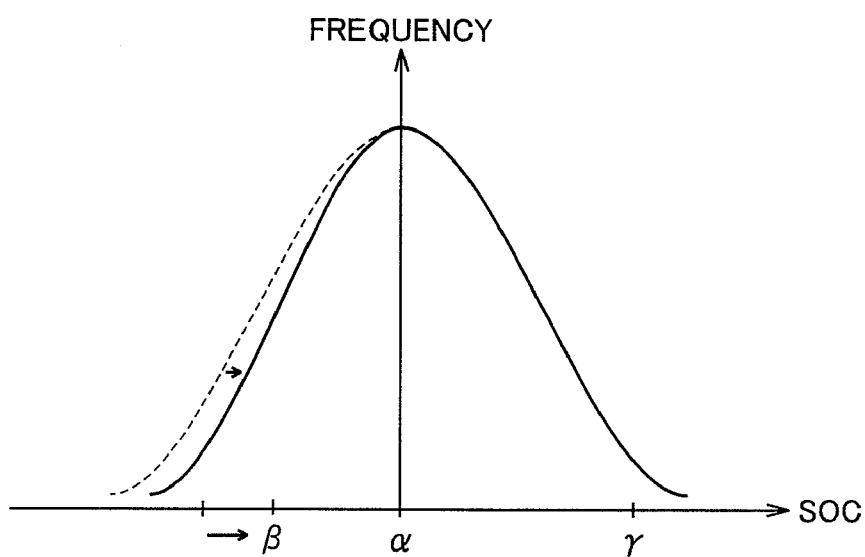
FIG. 12 is a diagram showing a distribution of the SOC value at the time when battery power determination unit 133 in FIG. 2 determines the battery power based on a map MP1 shown in FIG. 11.

FIG. 12 is a diagram showing a distribution of the SOC value at the time when battery power determination unit 133 in FIG. 2 determines the battery power based on map MP1 shown in FIG. 11.

Referring to FIG. 12, the distribution curve in a solid line represents a distribution of the SOC value at the time when battery power determination unit 133 in FIG. 2 determines the battery power based on map MP1 shown in FIG. 11, and the distribution curve in a dashed line is similar to the distribution curve shown in FIG. 10. The distribution curve in a solid line shows a decrease in the frequency in which the SOC value smaller than SOC value α occurs. In other words, the SOC value of the battery is maintained at the high level.

Furthermore, the distribution curve in a solid line shows that battery power determination unit 133 determines the battery power in accordance with map MP1 to thereby cause the charging of the battery to be suppressed. As previously described, the fact that the SOC value of the battery is maintained at the high level means that the battery is preferentially discharged. Therefore, in the case where the SOC value of the battery is maintained at the high level, the charging of the battery is suppressed. Some batteries may generate more heat during charging than during discharging. In other words, in the case where battery power determination unit 133 determines the battery power in accordance with map MP1, the heat generation of the battery can be suppressed not only by maintaining the SOC value at the high level to reduce the current flowing through the battery, but also by decreasing the frequency in which the battery is charged.

Figure 13:
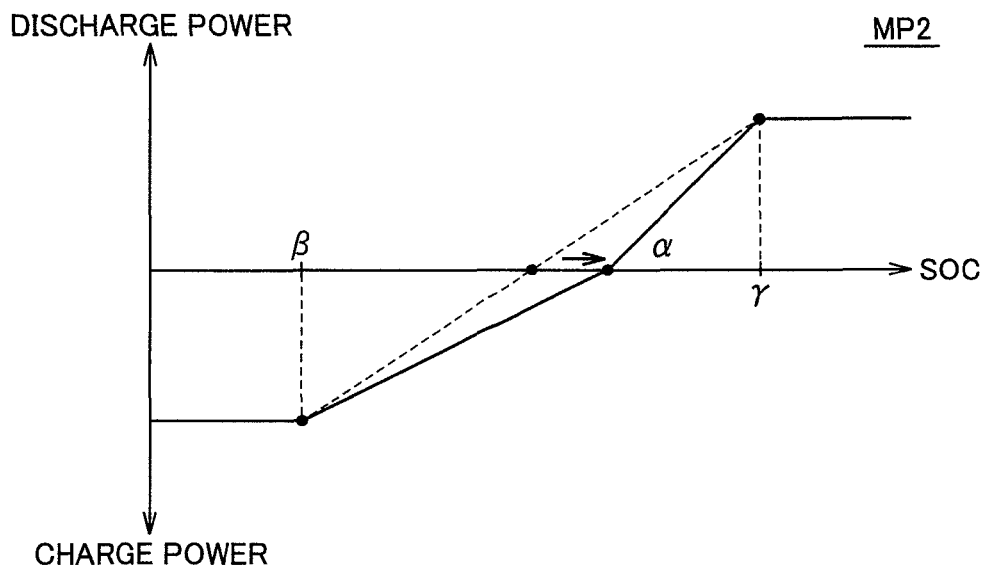
FIG. 13 is a diagram showing another modification of map MP0 shown in FIG. 9.

FIG. 13 is a diagram showing another modification of map MP0 shown in FIG. 9.

Referring to FIGS. 13 and 9, a map MP2 is different from map MP0 in that SOC value α is shifted to the high SOC value side.

Figure 14:
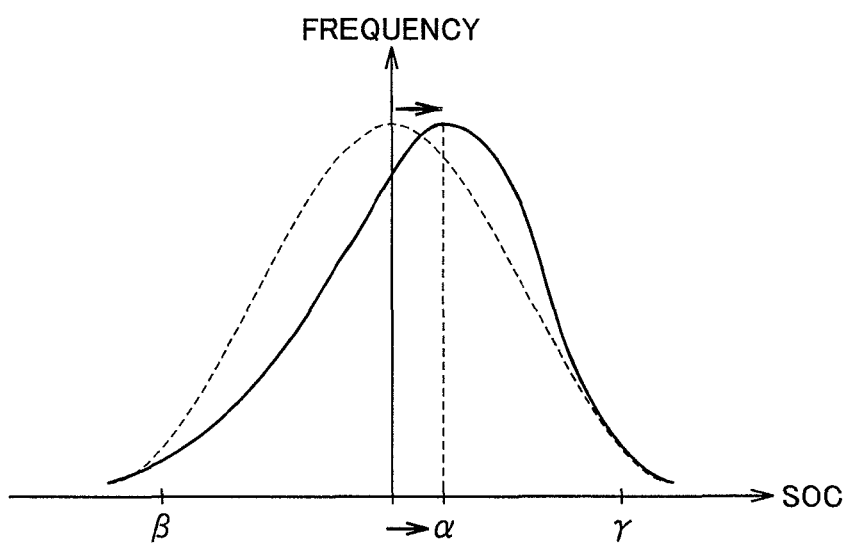
FIG. 14 is a diagram showing a distribution of the SOC value at the time when battery power determination unit 133 in FIG. 2 determines the battery power based on a map MP2 shown in FIG. 13.

FIG. 14 is a diagram showing a distribution of the SOC value at the time when battery power determination unit 133 in FIG. 2 determines the battery power based on map MP2 shown in FIG. 13.

Referring to FIG. 14, the distribution curve in a solid line represents a distribution of the SOC value at the time when battery power determination unit 133 in FIG. 2 determines the battery power based on map MP2 shown in FIG. 13, and the distribution curve in a dashed line is similar to the distribution curve shown in FIG. 10. The distribution curve in a solid line shows that, when SOC value a is shifted to the high SOC value side, the peak of the distribution of the SOC value is also shifted to the high SOC value side. In other words, battery power determination unit 133 switches the battery between charging and discharging in accordance with map MP2, which allows the battery to be charged/discharged while the SOC value is maintained at the high level. Since this causes the battery voltage to be maintained at the high level, the battery current can be reduced. Therefore, the heat generation of the battery is suppressed.

Figure 15:
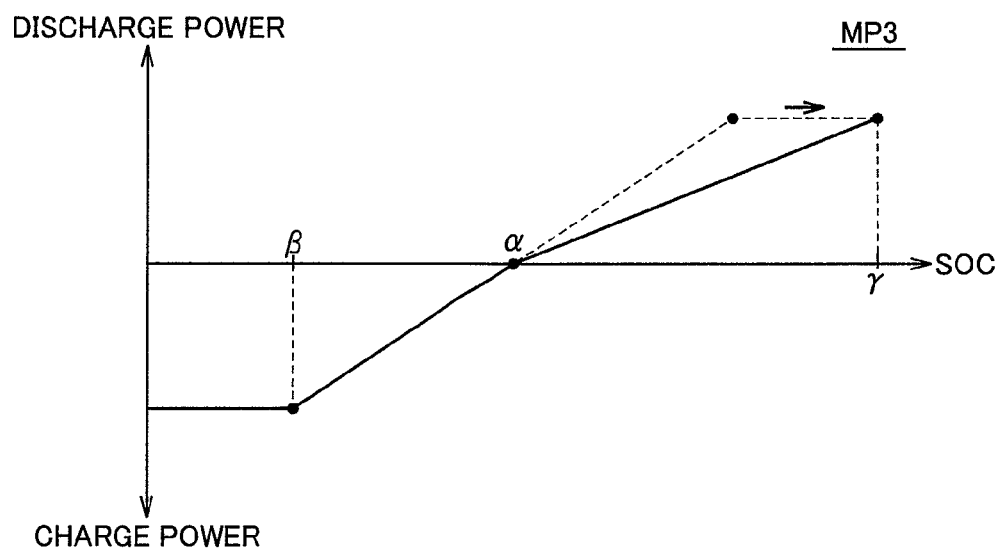
FIG. 15 is a diagram showing still another modification of map MP0 shown in FIG. 9.

FIG. 15 is a diagram showing still another modification of map MP0 shown in FIG. 9.

Referring to FIGS. 15 and 9, a map MP3 is different from map MP0 in that SOC value γ is shifted to the high SOC value side.

Figure 16:
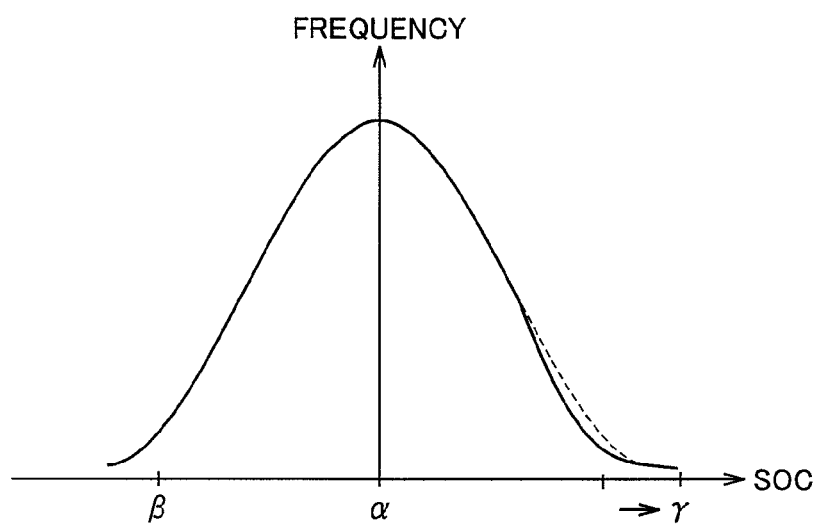
FIG. 16 is a diagram showing a distribution of the SOC value at the time when battery power determination unit 133 in FIG. 2 determines the battery power based on a map MP3 shown in FIG. 15.

FIG. 16 is a diagram showing a distribution of the SOC value at the time when battery power determination unit 133 in FIG. 2 determines the battery power based on map MP3 shown in FIG. 15.

Referring to FIG. 16, the distribution curve in a solid line represents a distribution of the SOC value at the time when battery power determination unit 133 in FIG. 2 determines the battery power based on map MP3 shown in FIG. 15, and the distribution curve in a dashed line is similar to the distribution curve shown in FIG. 10. The distribution curve in a solid line shows a decrease in the frequency in which the SOC value is at the high level. In other words, in the case where battery power determination unit 133 determines the battery power in accordance with map MP3, the SOC value is maintained at the high level and electric power value Pout shown in FIG. 2 is also suppressed. Consequently, the current output from the battery during discharging of the battery can be suppressed. Accordingly, the SOC value can be maintained at the high level while the battery current can also be suppressed, with the result that the heat generation of the battery can be suppressed. However, in map MP3, the discharge power is set such that the behavior of vehicle 100 shown in FIG. 1 or the operation efficiency of engine 4 is not affected.

Figure 17:
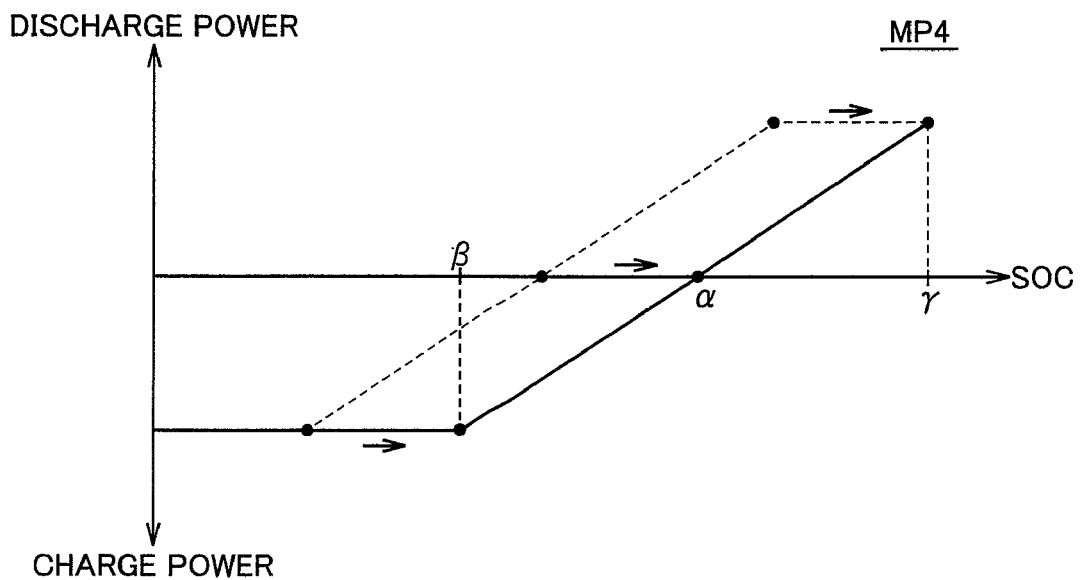
FIG. 17 is a diagram showing still another modification of map MP0 shown in FIG. 9.

FIG. 17 is a diagram showing still another modification of map MP0 shown in FIG. 9.

Referring to FIGS. 17 and 9, a map MP4 is different from map MP0 in that SOC value α, SOC value β and SOC value γ are uniformly shifted to the high SOC value side.

Figure 18:
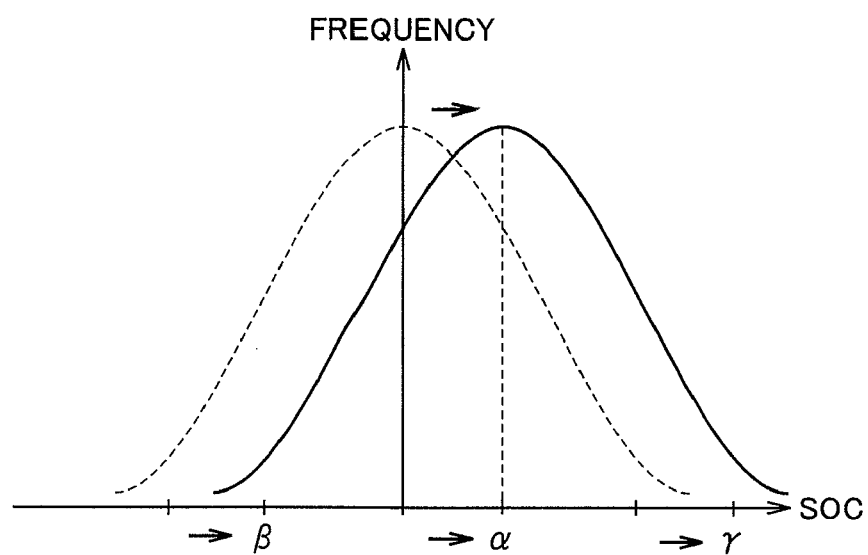
FIG. 18 is a diagram showing a distribution of the SOC value at the time when battery power determination unit 133 in FIG. 2 determines the battery power based on a map MP4 shown in FIG. 17.

FIG. 18 is a diagram showing a distribution of the SOC value at the time when battery power determination unit 133 in FIG. 2 determines the battery power based on map MP4 shown in FIG. 17.

Referring to FIG. 18, the distribution curve in a solid line represents a distribution of the SOC value at the time when battery power determination unit 133 in FIG. 2 determines the battery power based on map MP4 shown in FIG. 17, and the distribution curve in a dashed line is similar to the distribution curve shown in FIG. 10. The distribution curve in a solid line is shifted to the high SOC value side with respect to the distribution curve in a dashed line. In the case where battery power determination unit 133 in FIG. 2 determines the battery power based on map MP4, the effect of shifting SOC value α, the effect of shifting SOC value β and the effect of shifting SOC value γ are achieved.

In the process in step S3 in FIG. 8, battery power determination unit 133 may shift any two of SOC value α, SOC value β and SOC values γ in map MP0 in FIG. 9 to the high SOC value side as the temperature of the battery rises.

Referring to FIGS. 1 and 2, the charge/discharge control device for a secondary battery according to the first embodiment will be comprehensively described. The charge/discharge control device for a secondary battery according to the first embodiment includes temperature sensor 42 detecting temperature TB of battery B, SOC calculation unit 132 detecting the state of charge of battery B, and battery power determination unit 133 setting the battery power charged to and discharged from battery B based on temperature TB detected by temperature sensor 42 and the state of charge detected by SOC calculation unit 132. Battery power determination unit 133 sets the battery power such that the state of charge is increased as temperature TB rises.

Preferably, at least one of SOC value a representing the state of charge at the time of switching between charging and discharging of battery B; SOC value β representing the state of charge at the time when the battery power charged to battery B reaches the limit value in the case where the SOC value falls below SOC value α; and SOC value γ representing the SOC value at the time when the battery power discharged from battery B reaches the limit value in the case where the SOC value exceeds SOC value α is set by battery power determination unit 133 to be increased as temperature TB rises. Battery power determination unit 133 sets the battery power based on SOC value α, SOC value β, SOC value γ, and the state of charge detected by SOC calculation unit 132.

Accordingly, the desired electric power can be input to and output from the battery irrespective of the temperature of the battery. Therefore, according to the first embodiment, the performance of the battery can be more effectively achieved.

Furthermore, according to the first embodiment, even in the case where the battery is charged/discharged at the time when the battery is of a high temperature, a further increase in the battery temperature can be prevented.

Furthermore, according to the first embodiment, a decrease in the operation efficiency of the engine can be prevented by more effectively achieving the battery performance. Therefore, the vehicle performance can also be more effectively achieved.

Preferably, battery B includes a lithium-ion battery. This allows a rise in temperature of the battery to be suppressed when battery B is charged.

Second Embodiment

The configuration of the vehicle equipped with the charge/discharge control device for a secondary battery according to the second embodiment is the same as that having a control device 30A in place of control device 30 in the configuration of vehicle 100 shown in FIG. 1. Furthermore, the configuration of control device 30A is the same as that having a battery power determination unit 133A in place of battery power determination unit 133 in the configuration of control device 30 shown in FIG. 2.

Battery power determination unit 133A is the same as battery power determination unit 133 in that map MP0 shown in FIG. 9 is changed in accordance with temperature TB of battery B. However, based on the distribution of the value of the state of charge detected by SOC calculation unit 132, battery power determination unit 133A selects the value that is to be shifted to the high SOC value side from SOC value α, SOC value β and SOC value γ defined in map MP0 in FIG. 9.

Figure 19:
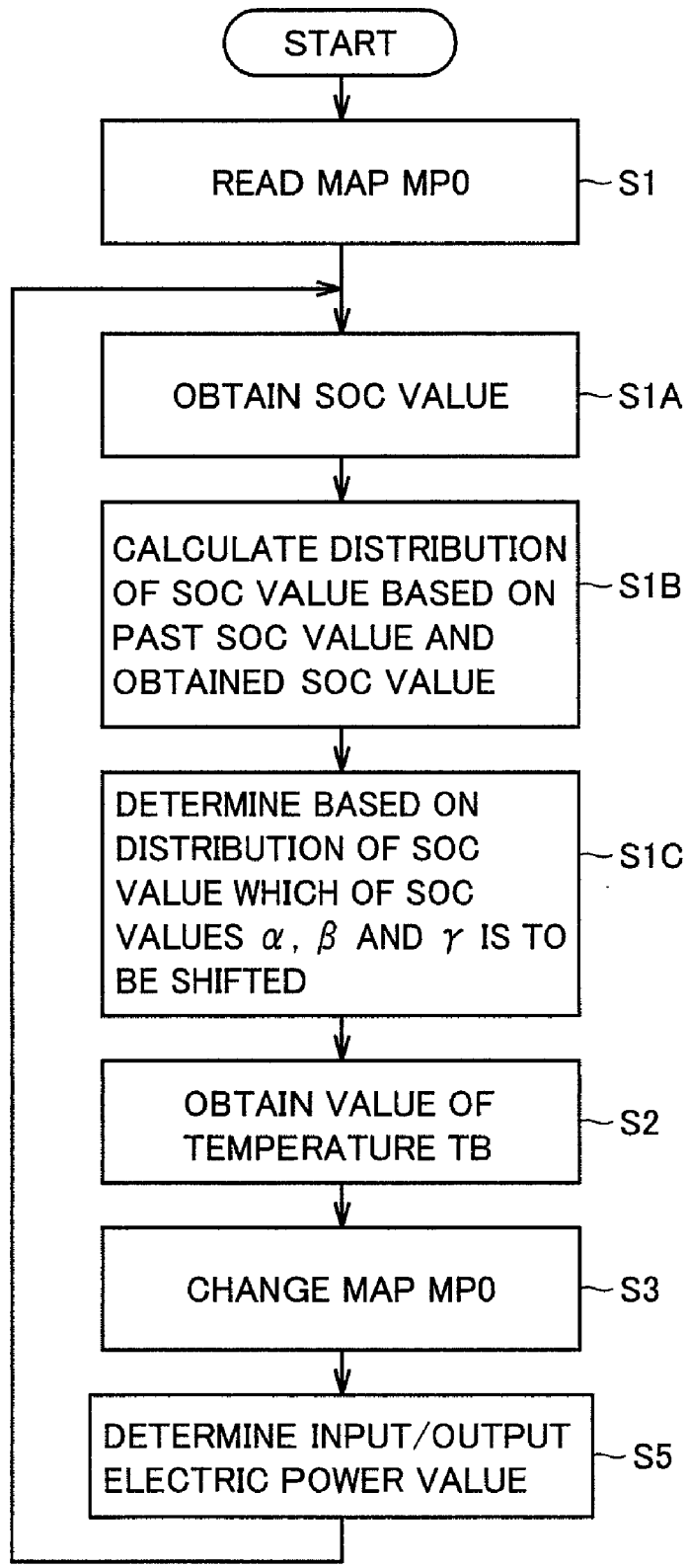
FIG. 19 is a flowchart illustrating the determination process of electric power value Pin/Pout by a battery power determination unit 133A in FIG. 2.

FIG. 19 is a flowchart illustrating the determination process of electric power value Pin/Pout by battery power determination unit 133A in FIG. 2. It is to be noted that the process shown in this flowchart is called from the main routine and executed, for example, every time the predetermined condition is satisfied (for example, at the time when the vehicle is started).

First, referring to FIGS. 19 and 8, the flowchart shown in FIG. 19 is different from the flowchart shown in FIG. 8 in that (1) the processes of steps S1A, S1B and S1C are added between step S1 and step S2 and (2) the process of step S4 is not included. It is to be noted that the processes of other steps in the flowchart in FIG. 19 are the same as those of the corresponding steps in the flowchart shown in FIG. 8. Thus, the processes of steps S1A, S1B and S1C will be mainly described below.

Referring to FIGS. 19 and 2, battery power determination unit 133A obtains an SOC value from SOC calculation unit 132 (step S1A). Battery power determination unit 133A then calculates a distribution of the SOC value based on the past SOC value and the SOC value obtained in step S1A (step S1B). Based on the distribution of the calculated SOC value, battery power determination unit 133 subsequently determines which of SOC value α, SOC value β and SOC value γ in map MP0 in FIG. 9 is to be shifted to the high SOC value side (step S1C). When the process of step S1C is completed, the entire process proceeds to step S2.

For example, battery power determination unit 133A stores the distribution curve shown in FIG. 10 in advance and compares this distribution curve with the distribution of the calculated SOC value, to determine which of SOC value α, SOC value β and SOC value γ is shifted. The map in which SOC value α is shifted is the same as map MP2 shown in FIG. 13. The map in which SOC value α is shifted is the same as map MP1 shown in FIG. 11. The map in which SOC value γ is shifted is the same as map MP3 shown in FIG. 15.

Thus, battery power determination unit 133A determines the electric power value at the time of the charging/discharging operation based on the actual charging/discharging operation of the battery such that the SOC value is at a higher level than usual when the battery is of a high temperature. Accordingly, the second embodiment allows the heat generation of the battery to be more effectively suppressed than in the first embodiment.

<Modification>

Figure 20:
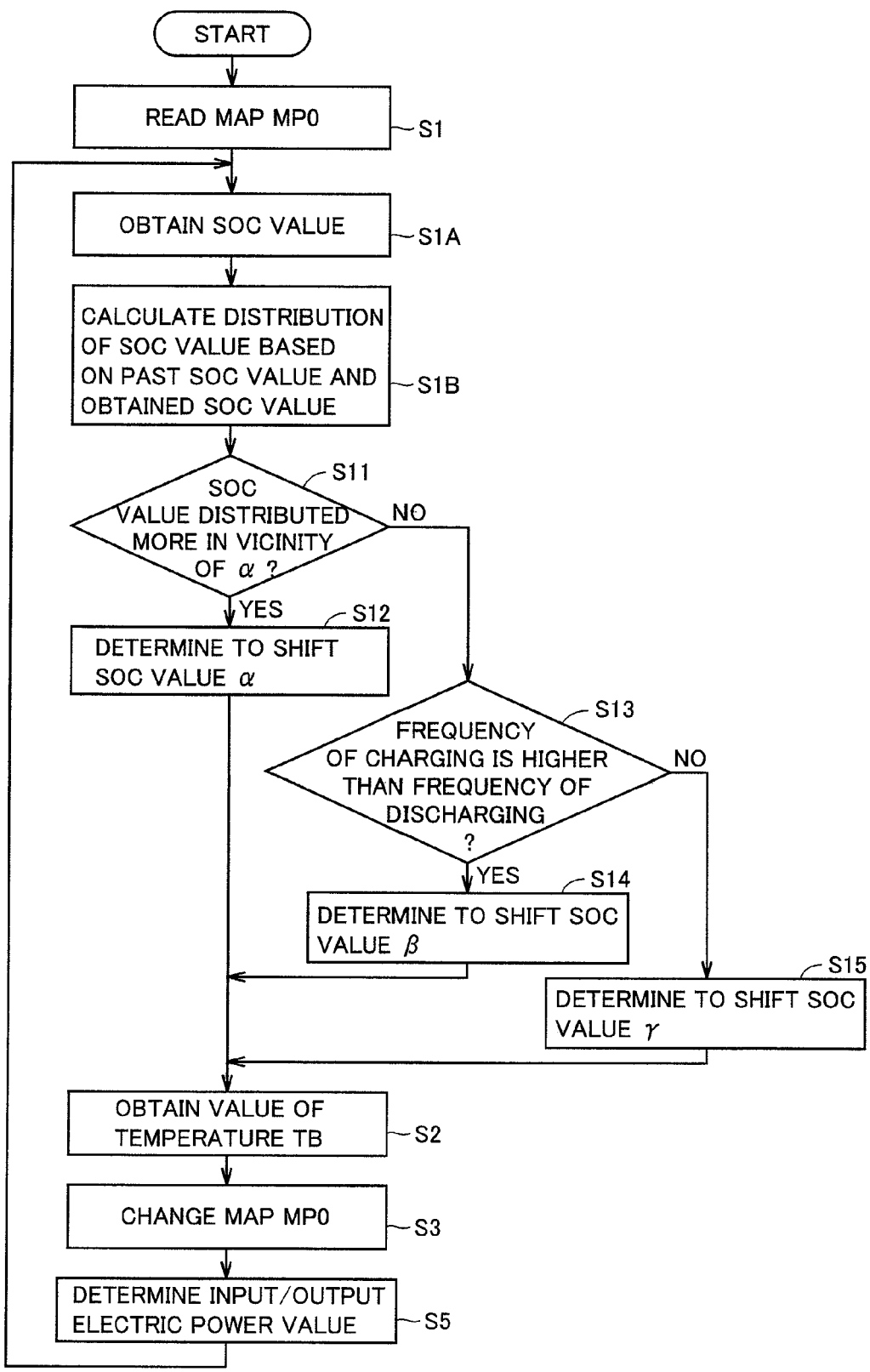
FIG. 20 is a flowchart illustrating a modification of the determination process of electric power value Pin/Pout by battery power determination unit 133A in FIG. 2.

FIG. 20 is a flowchart illustrating a modification of the determination process of electric power value Pin/Pout by battery power determination unit 133A in FIG. 2. It is to be noted that the process shown in this flowchart is called from the main routine and executed, for example, every time the predetermined condition is satisfied (for example, at the time when the vehicle is started).

Referring to FIGS. 20 and 19, the flowchart shown in FIG. 20 is different from the flowchart shown in FIG. 19 in that the processes of S11-S15 are included in place of the process of step S1C. It is to be noted that the processes of other steps in the flowchart in FIG. 20 are the same as those of the corresponding steps in the flowchart shown in FIG. 19. Thus, the processes of steps S11-S15 will be mainly described below.

Referring to FIGS. 20 and 2, battery power determination unit 133A first determines whether the SOC value calculated by SOC calculation unit 132 (hereinafter merely referred to as an "SOC value") is distributed more in the vicinity of SOC value α (step S11). In step S11, battery power determination unit 133A stores the distribution curve shown in FIG. 10 in advance and compares this distribution curve with the distribution of the calculated SOC value, to thereby determine whether the SOC value is distributed more in the vicinity of SOC value α. The fact that the SOC value is distributed more in the vicinity of SOC value α means that switching between charging and discharging of battery B is repeated frequently (a predetermined number of times or more) within a predetermined period of time.

If the SOC value is distributed more in the vicinity of SOC value α (YES in step S11), the process proceeds to step S12, and if not (NO in step S11), the process proceeds to step S13.

In step S12, battery power determination unit 133A determines to shift SOC value α in map MP0 in FIG. 9. On the other hand, in step S13, battery power determination unit 133A determines whether charging is performed more frequently than discharging.

In the case where the frequency in which the SOC value is smaller than SOC value α is higher than the frequency in which the SOC value is larger than SOC value α, battery power determination unit 133A determines that charging is performed more frequently than discharging. In this case (YES in step S13), battery power determination unit 133A determines to shift SOC value β to the high SOC value side in map MP0 in FIG. 9 (step S14).

In the case where the frequency in which the SOC value is larger than SOC value α is higher than the frequency in which the SOC value is smaller than SOC value α, battery power determination unit 133A determines that discharging is performed more frequently than charging. In this case (NO in step S13), battery power determination unit 133A determines to shift SOC value γ to the high SOC value side in map MP0 in FIG. 9 (step S15).

When the process of any one of steps S12, S14 and S15 is completed, the entire process proceeds to step S2.

For example, when vehicle 100 shown in FIG. 1 travels on the road in a traffic jam, vehicle 100 is repeatedly started and stopped. In this case, when vehicle 100 is started, battery B is discharged for driving motor generator MG2, and, when vehicle 100 is stopped, battery B is charged with the electric power generated by motor generator MG2 in accordance with regenerative braking. In other words, when vehicle 100 is traveling on the road in a traffic jam, switching between charging and discharging of battery B is frequently performed. In this case, battery power determination unit 133A determines to shift SOC value α in map MP0 in FIG. 9 (step S12 in FIG. 20).

Furthermore, in the driving area where the engine efficiency is excellent, vehicle 100 shown in FIG. 1 runs mainly with the output of engine 4. In the case where the SOC value of battery B is decreased in this running state, an increase in the output of engine 4 causes motor generator MG1 to generate electric power, with which battery B is then charged. In this vehicle state, battery power determination unit 133A determines to shift SOC value β in map MP0 in FIG. 9 to the high SOC value side (step S14 in FIG. 20). In this case, since the frequency in which battery B is charged can be decreased, the number of times of operation of motor generator MG1 can be reduced. In other words, since more output of the engine can be used for vehicle running, the running speed of the vehicle can be raised as the engine output is increased. Accordingly, the running speed of the vehicle can be raised, for example, in accordance with an increase in the amount of the accelerator pedal depressed by the operator, with the result that the operability of the vehicle can be improved.

Furthermore, in the case where the vehicle is running in the driving area where the engine efficiency is excellent (but not at high speed), battery power determination unit 133A determines to shift SOC value γ in map MP0 in FIG. 9 (step S15 in FIG. 20). In this case, it becomes possible to continue to operate the engine, for example, such that the best engine efficiency is achieved.

Thus, in the modification according to the second embodiment, in the case where the frequency in which the SOC value calculated by SOC calculation unit 132 is smaller than SOC value α is higher than the frequency in which the calculated SOC value is larger than SOC value α, battery power determination unit 133A selects SOC value β as a value which is to be shifted to the high SOC value side. Furthermore, in the case where the frequency in which the SOC value calculated by SOC calculation unit 132 is larger than SOC value α is higher than the frequency in which the calculated SOC value is smaller than SOC value α, battery power determination unit 133A selects SOC value γ as a value which is to be shifted to the high SOC value side.

Further preferably, in the case where switching between charging and discharging of battery B is repeated a predetermined number of times or more within a predetermined period of time, battery power determination unit 133A selects SOC value α as a value which is to be shifted to the high SOC value side.

Consequently, according to the modification, the SOC can be controlled in accordance with the running state of the vehicle.

It is to be noted that the present embodiments have shown the example that is applied to a series/parallel type hybrid vehicle in which the power of the engine can be divided by the power split device and transmitted into the axle and the power generator. However, the present invention can also be applied to a series type hybrid vehicle in which the engine is used only for driving the power generator and the driving force of the axle is generated only by the motor using the electric power generated by the power generator, and also to an electric vehicle which runs only by the motor.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A charge/discharge control device for a secondary battery, comprising:
    a temperature detecting unit detecting a battery temperature of said secondary battery;
    a state-of-charge detecting unit detecting a state of charge of said secondary battery to output a state value indicating said state of charge; and
    a setting unit, in a case where said state value falls below a first value corresponding to a threshold value for determining whether charging or discharging of said secondary battery is prioritized, setting a charge power of said secondary battery such that said charge power increases as said state value decreases and a value of said charge power attains a first limit value when said state value reaches a second value, and, in a case where said state value exceeds said first value, setting a discharge power of said secondary battery such that said discharge power increases as said state value increases and a value of said discharge power attains a second limit value when said state value reaches a third value,
    said setting unit selecting, based on a distribution of said state value, at least one of said first value, said second value and said third value as an object to be varied which varies in accordance with said battery temperature detected by said temperature detecting unit, and increasing a value of said object to be varied as said battery temperature rises.

2. The charge/discharge control device for a secondary battery according to claim 1, wherein said setting unit selects said second value as said object to be varied when a frequency in which said state value is smaller than said first value is higher than a frequency in which said state value is larger than said first value, and selects said third value as said object to be varied when a frequency in which said state value is larger than said first value is higher than a frequency in which said state value is smaller than said first value.

3. The charge/discharge control device for a secondary battery according to claim 1, wherein said setting unit selects said first value as said object to be varied when switching between charging and discharging of said secondary battery is repeated a predetermined number of times or more within a predetermined period of time.

4. The charge/discharge control device for a secondary battery according to claim 1, wherein said secondary battery includes a lithium-ion battery.

5. A vehicle comprising:
    a secondary battery; and
    a charge/discharge control device for said secondary battery,
    said charge/discharge control device including
    a temperature detecting unit detecting a battery temperature of said secondary battery,
    a state-of-charge detecting unit detecting a state of charge of said secondary battery to output a state value indicating said state of charge, and
    a setting unit, in a case where said state value falls below a first value corresponding to a threshold value for determining whether charging or discharging of said secondary battery is prioritized, setting a charge power of said secondary battery such that said charge power increases as said state value decreases and a value of said charge power attains a first limit value when said state value reaches a second value, and, in a case where said state value exceeds said first value, setting a discharge power of said secondary battery such that said discharge power increases as said state value increases and a value of said discharge power attains a second limit value when said state value reaches a third value, said setting unit selecting, based on a distribution of said state value, at least one of said first value, said second value and said third value as an object to be varied which varies in accordance with said battery temperature detected by said temperature detecting unit, and increasing said object to be varied as said battery temperature rises.

6. The vehicle according to claim 5, wherein said setting unit selects said second value as said object to be varied when a frequency in which said state value is smaller than said first value is higher than a frequency in which said state value is larger than said first value, and selects said third value as said object to be varied when a frequency in which said state value is larger than said first value is higher than a frequency in which said state value is smaller than said first value.

7. The vehicle according to claim 5, wherein said setting unit selects said first value as said object to be varied when switching between charging and discharging of said secondary battery is repeated a predetermined number of times or more within a predetermined period of time.

8. The vehicle according to claim 5, wherein said secondary battery includes a lithium-ion battery.

9. A charge/discharge control device for a secondary battery, comprising:
   a temperature detecting unit detecting a battery temperature of said secondary battery;
   a state-of-charge detecting unit detecting a state of charge of said secondary battery; and
   a setting unit setting a battery power charged to and discharged from said secondary battery, based on said battery temperature detected by said temperature detecting unit and said state of charge detected by said state-of-charge detecting unit,
   said setting unit, based on a distribution of a value of said state of charge detected by said state-of-charge detecting unit, selecting at least one of a first value, a second value and a third value as a value of an object to be set which is set to be increased as said battery temperature rises, said first value indicating said state of charge at a time of switching between charging and discharging of said secondary battery, said second value indicating said state of charge at a time when said battery power charged to said secondary battery reaches a limit value in a case where said state of charge falls below said first value, and said third value indicating said state of charge at a time when said battery power discharged from said secondary battery reaches the limit value in a case where said state of charge exceeds said first value; and setting said battery power based on said first to third values and said state of charge detected by said state-of-charge detecting unit.

10. The charge/discharge control device for a secondary battery according to claim 9, wherein said setting unit selects said second value as the value of said object to be set when a frequency in which said state of charge is smaller than said first value is higher than a frequency in which said state of charge is larger than said first value, and selects said third value as the value of said object to be set when a frequency in which said state of charge is larger than said first value is higher than a frequency in which said state of charge is smaller than said first value.

11. The charge/discharge control device for a secondary battery according to claim 9, wherein said setting unit selects said first value as the value of said object to be set when switching between charging and discharging of said secondary battery is repeated a predetermined number of times or more within a predetermined period of time.

12. The charge/discharge control device for a secondary battery according to claim 9, wherein said secondary battery includes a lithium-ion battery.

13. A vehicle comprising:
   a secondary battery; and
   a charge/discharge control device for said secondary battery,
   said charge/discharge control device including
   a temperature detecting unit detecting a battery temperature of said secondary battery,
   a state-of-charge detecting unit detecting a state of charge of said secondary battery, and
   a setting unit setting a battery power charged to and discharged from said secondary battery, based on said battery temperature detected by said temperature detecting unit and said state of charge detected by said state-of-charge detecting unit, said setting unit, based on a distribution of a value of said state of charge detected by said state-of-charge detecting unit, selecting at least one of a first value, a second value and a third value as a value of an object to be set which is set to be increased as said battery temperature rises, said first value indicating said state of charge at a time of switching between charging and discharging of said secondary battery, said second value indicating said state of charge at a time when said battery power charged to said secondary battery reaches a limit value in a case where said state of charge falls below said first value, and said third value indicating said state of charge at a time when said battery power discharged from said secondary battery reaches the limit value in a case where said state of charge exceeds said first value; and setting said battery power based on said first to third values and said state of charge detected by said state-of-charge detecting unit.

14. The vehicle according to claim 13, wherein said setting unit selects said second value as the value of said object to be set when a frequency in which said state of charge is smaller than said first value is higher than a frequency in which said state of charge is larger than said first value, and selects said third value as the value of said object to be set when a frequency in which said state of charge is larger than said first value is higher than a frequency in which said state of charge is smaller than said first value.

15. The vehicle according to claim 13, wherein said setting unit selects said first value as the value of said object to be set when switching between charging and discharging of said secondary battery is repeated a predetermined number of times or more within a predetermined period of time.

16. The vehicle according to claim 13, wherein said secondary battery includes a lithium-ion battery.

* * * * *